United States Patent
Li

(10) Patent No.: US 11,288,790 B2
(45) Date of Patent: Mar. 29, 2022

(54) DISPLAY PANEL INSPECTION METHOD AND APPARATUS

(71) Applicants: HKC Corporation Limited, Guangdong (CN); Chongqing HKC Optoelectronics Technology Co., Ltd., Chongqing (CN)

(72) Inventor: Jin Li, Chongqing (CN)

(73) Assignees: HKC Corporation Limited, Shenzhen (CN); Chongqing HKC Optoelectronics Technology Co., Ltd., Chongqing (CN)

( * ) Notice: Subject to any disclaimer, the term of this patent is extended or adjusted under 35 U.S.C. 154(b) by 747 days.

(21) Appl. No.: 16/313,879

(22) PCT Filed: Oct. 23, 2017

(86) PCT No.: PCT/CN2017/107259
§ 371 (c)(1),
(2) Date: Dec. 27, 2018

(87) PCT Pub. No.: WO2019/000726
PCT Pub. Date: Jan. 3, 2019

(65) Prior Publication Data
US 2019/0333203 A1    Oct. 31, 2019

(30) Foreign Application Priority Data
Jun. 30, 2017    (CN) .......................... 201710527162.4

(51) Int. Cl.
*G06K 9/00* (2006.01)
*G06T 7/00* (2017.01)
*G06T 7/90* (2017.01)

(52) U.S. Cl.
CPC ................ *G06T 7/001* (2013.01); *G06T 7/90* (2017.01); *G06T 7/97* (2017.01); *G06T 2207/30121* (2013.01)

(58) Field of Classification Search
CPC .. G06T 7/001; G06T 7/90; G06T 7/97; G06T 2207/30121; G06T 2207/10152; G09G 3/20; G09G 3/006; G02F 1/1309
See application file for complete search history.

(56) References Cited

U.S. PATENT DOCUMENTS

2013/0307883 A1* 11/2013 You ...................... G09G 3/3607
                                                              345/690

FOREIGN PATENT DOCUMENTS

WO    WO-2010024303 A1 *    3/2010    ........... G02F 1/1303
WO    WO-2014101304 A1 *    7/2014    ............. G01N 21/95

* cited by examiner

*Primary Examiner* — Dhaval V Patel

(57) ABSTRACT

A display panel inspection method and a apparatus are provided, and the method includes the steps of: capturing a grayscale image while a predetermined light source is irradiating a display panel, and the grayscale image including plural pixel electrode images corresponsive to plural pixel electrodes in the display panel respectively; obtaining a grayscale range of the respective pixel electrode image; calling a predetermined correspondence between a predetermined grayscale range and a pixel electrode type; and identifying the pixel electrode type of the respective pixel electrode image according to the predetermined correspondence and the grayscale range.

20 Claims, 3 Drawing Sheets

DISPLAY PANEL INSPECTION METHOD AND APPARATUS

TECHNICAL FIELD

The present disclosure relates to the technical field of displays, in particular to a display panel inspection and apparatus.

BACKGROUND

At present, liquid crystal display panels are applied extensively in electronic devices such as mobile phones, tablet PCs, computer display devices, etc. However, it is very difficult to inspect defects in the manufacture of the liquid crystal display panels, so that a defect inspection of the display panels is required. In a common inspection method, a transmitted light source is irradiated onto the display panel, but the structural design of various display panel testing equipments generally has limitations on the inspection by using the transmitted light source, and only reflected light can be used for the purpose, so that inspection technicians cannot distinguish different types of the pixel electrodes such as the RGB pixel electrodes from the inspection screen. Particularly, the RGB pixel electrodes have a similar pattern shape, so that the inspection technicians have difficulty or fail to distinguish the pixel electrodes of different types. Obviously, it causes a tremendous trouble to the inspection of the pixel electrodes.

SUMMARY

Therefore, it is a primary objective of the present disclosure to provide a display panel inspection method and apparatus to overcome the drawback of the conventional display panel inspection method which cannot distinguish the pixel electrodes of different types.

To achieve the aforementioned and other objectives, the present disclosure provides a display panel inspection method, comprising the steps of: capturing a grayscale image when a display panel is irradiated by a predetermined light source, wherein the grayscale image includes a plurality of pixel electrode images corresponding to a plurality of pixel electrodes in the display panel respectively; obtaining a grayscale range of the respective pixel electrode image; calling a predetermined correspondence between a predetermined grayscale range and a pixel electrode type; identifying the pixel electrode type of the pixel electrode image according to the predetermined correspondence and grayscale range; determining whether or not the pixel electrode images corresponding to the pixel electrodes of the same type have a grayscale difference; determining whether or not the grayscale difference is greater than a predetermined threshold if the pixel electrode images corresponding to the pixel electrodes of the same type have a grayscale difference; deciding that the pixel electrode corresponding to the pixel electrode image having the grayscale difference is an abnormal pixel electrode, if the grayscale difference is greater than the predetermined threshold.

To achieve the aforementioned and other objectives, the present disclosure also provides a display panel inspection method, comprising the steps of: capturing a grayscale image when a display panel is irradiated by a predetermined light source, wherein the grayscale image includes a plurality of pixel electrode images corresponding to a plurality of pixel electrodes in the display panel respectively; obtaining a grayscale range of the corresponding pixel electrode image; calling a predetermined correspondence between a predetermined grayscale range and a pixel electrode type; and identifying the pixel electrode type of the pixel electrode image according to the predetermined correspondence and grayscale range.

To achieve the aforementioned and other objectives, the present disclosure further provides a display panel inspection apparatus, comprising: a first capture unit, for capturing a grayscale image when a display panel is irradiated by a predetermined light source, wherein the grayscale image includes a plurality of pixel electrode images corresponding to the plurality of pixel electrodes in the display panel respectively; a second capture unit, for obtaining a grayscale range of the corresponding pixel electrode image; a calling unit, for calling a predetermined correspondence between a predetermined grayscale range and a pixel electrode type; and an identification unit, for identifying the pixel electrode type of the pixel electrode image according to the predetermined correspondence and grayscale range.

In the inspection method in accordance with an embodiment of the present disclosure, the corresponding grayscale image is captured when the display panel is irradiated by the predetermined light source, wherein the grayscale image includes a plurality of pixel electrode images corresponding to the plurality of pixel electrodes in the display panel respectively; and a grayscale range of the pixel electrode image is obtained; a predetermined correspondence between a predetermined grayscale range and a pixel electrode type is called; and the pixel electrode type of the pixel electrode image is identified according to the predetermined correspondence and grayscale range. The inspection method uses the grayscale to identify different types of pixel electrodes. In the meantime, the method is applicable for reflected light or transmitted light and capable of lowering the light source requirement for the design of the testing equipments. In addition, the method may be achieved by software without increasing the hardware cost.

DETAILED DESCRIPTION OF ILLUSTRATED EMBODIMENTS

Figure 1:
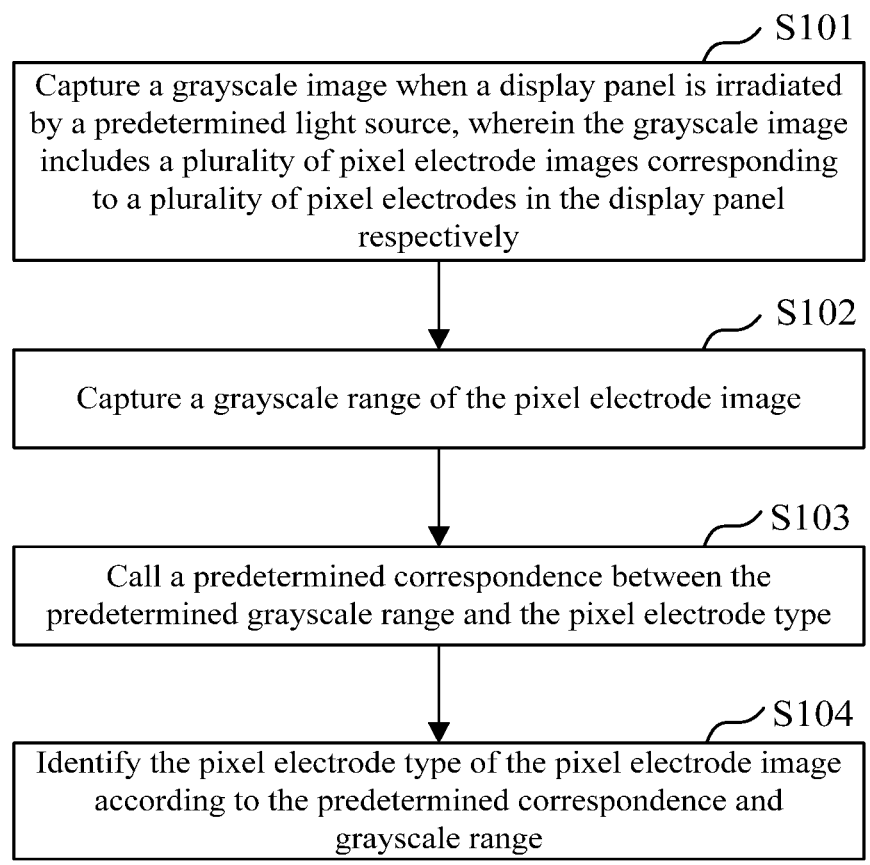
FIG. 1 is a flow chart of a display panel inspection method in accordance with an embodiment of the present disclosure.

The above and other objects, features and advantages of this disclosure will become apparent from the following detailed description taken with the accompanying drawings. Only some embodiments of the present disclosure have been illustrated in the drawings, but it should be pointed out that many other modifications are conceivable within the scope of the following claims.

With reference to FIG. 1 for a flow chart of a display panel inspection method in accordance with an embodiment of the present disclosure, the display panel inspection method comprises the following steps (S101~S104):

S101: Capture a grayscale image when a display panel is irradiated by a predetermined light source, wherein the grayscale image includes a plurality of pixel electrode images corresponding to a plurality of pixel electrodes in the display panel respectively.

In an embodiment of the present disclosure, the predetermined light source includes a white light source, a red light source, a green light source or a blue light source. There are two ways of irradiating the light source onto the display panel, respectively: a front irradiation and a back irradiation, wherein the front irradiation is corresponsive to the reflected light and the back irradiation is corresponsive to the transmitted light. This method reflects and forms images by the front irradiation in order to overcome the problem that inspection technicians cannot identify the pixel electrodes in inspection screen image for the reflected light.

The display panel is a liquid crystal display panel, a QLED display panel, an OLED display panel, a surface display panel, or any other equivalent display panel. The display panel includes a plurality of array type pixel electrodes. Therefore, the corresponding grayscale image captured when the display panel is irradiated by the predetermined light source includes a pixel electrode image corresponding to the plurality of pixel electrodes in the display panel while irradiating the predetermined light source.

Specifically, a panel screen image is captured in the display panel while irradiating the predetermined light source first, and then the panel screen image is converted into the grayscale image.

S102: Capture a grayscale range of the pixel electrode image.

In an embodiment of the present disclosure, the step of obtaining the grayscale range of the pixel electrode image refers to a step of obtaining the grayscale range of the corresponding pixel electrode image of the pixel electrode. Since the grayscale image includes a plurality of corresponding pixel electrode images of the pixel electrodes in the display panel while irradiating the predetermined light source, therefore the grayscale image can be used to analyze the plurality of pixel electrode images obtained from the grayscale image, and then the grayscale range of the pixel electrode image is obtained.

Wherein, the grayscale range covers seven ranges, respectively: white, grayish white, light gray, gray, dark gray, light black, and black, and these seven grayscale ranges can be distinguished by human eyes.

S103: Call a predetermined correspondence between the predetermined grayscale range and the pixel electrode type.

In an embodiment of the present disclosure, the pixel electrode type includes a red pixel electrode, a green pixel electrode, and a blue pixel electrode. The predetermined grayscale range is related to the light source parameters and the pixel electrode type, and different light sources irradiating different pixel electrodes will have different grayscale ranges respectively; and the same light source with different irradiation parameters irradiating on the same pixel electrode will have different grayscale ranges respectively, wherein the irradiation parameters include an irradiation distance or an irradiation angle, etc.

Therefore, the predetermined grayscale range refers to a grayscale range obtained in the conditions of a different type of pixel electrodes, the same light source, and the same irradiation parameters. The grayscale range and the pixel electrode have a one-to-one correspondence, and such one-to-one correspondence is the predetermined correspondence.

In an embodiment, the pixel electrode type includes a red pixel electrode, green pixel electrode, a blue pixel electrode, and a white pixel electrode.

S104: Identify the pixel electrode type of the pixel electrode image according to the predetermined correspondence and grayscale range.

In an embodiment of the present disclosure, the pixel electrode type of the pixel electrode image can be identified according to the grayscale range of the pixel electrode image and the predetermined correspondence. Specifically, the pixel electrode type is a red pixel electrode, a green pixel electrode, or a blue pixel electrode.

In the inspection method of this embodiment, a grayscale image is captured when the display panel is irradiated by the predetermined light source, wherein the grayscale image includes a plurality of pixel electrode images corresponding to plurality of pixel electrodes in the display panel; the grayscale range of the pixel electrode image is obtained; the predetermined correspondence between the predetermined grayscale range and the pixel electrode type is obtained; and the pixel electrode type of the pixel electrode image is identified according to the predetermined correspondence and the grayscale range. The inspection method uses the grayscale to identify different types of pixel electrodes. In the meantime, the method is applicable for reflected light or transmitted light and capable of lowering the light source requirement for the design of the testing equipments. In addition, the method may be achieved by software without increasing the hardware cost.

Figure 2:
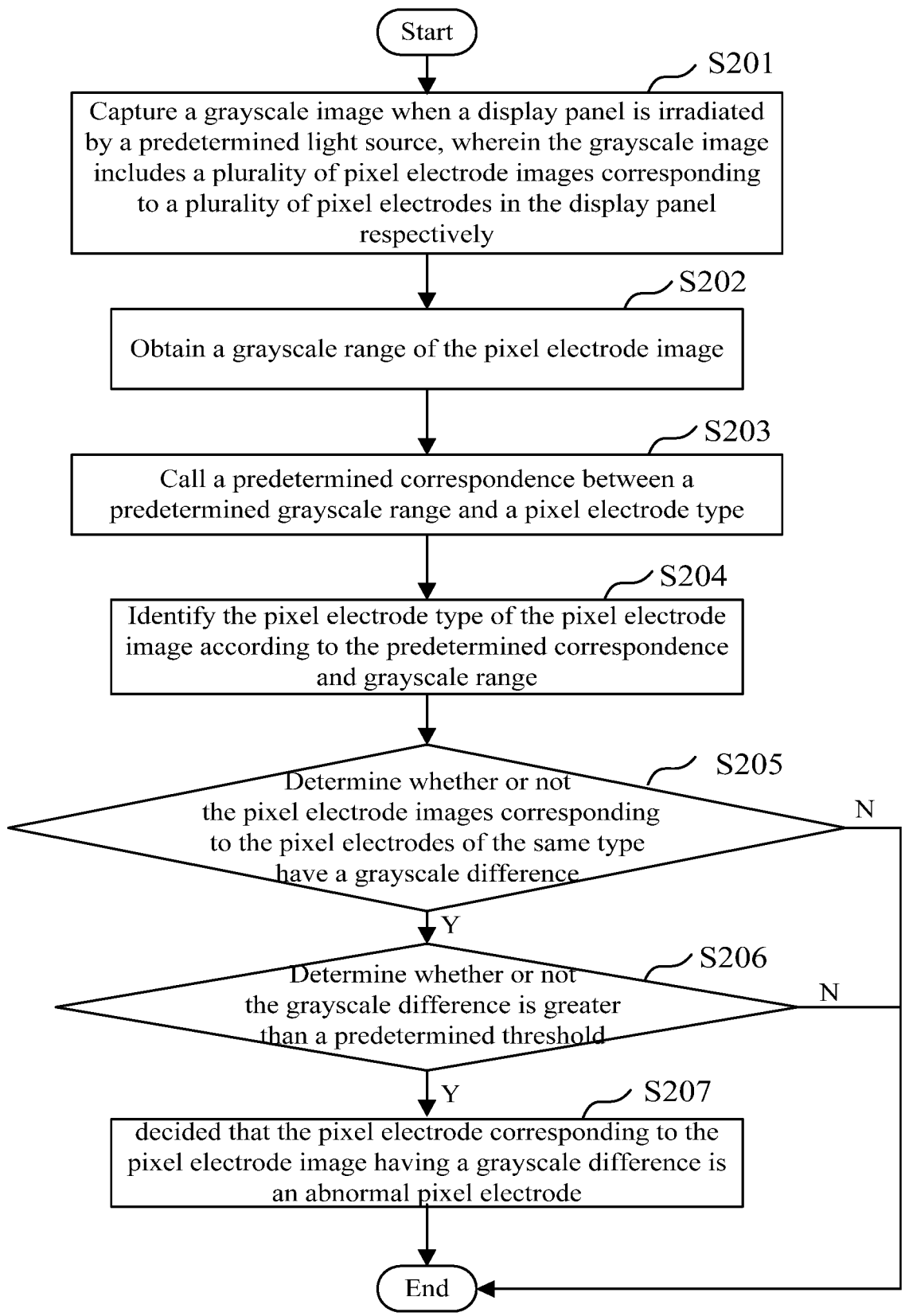
FIG. 2 is another flow chart of a display panel inspection method in accordance with an embodiment of the present disclosure.

With Reference to FIG. 2 for Another Flow Chart of a Display Panel Inspection Method in Accordance with an Embodiment of the Present Disclosure, the Display Panel Inspection Method Comprises the Following Steps (S201~S207):

S201: Capture a grayscale image when a display panel is irradiated by a predetermined light source, wherein the grayscale image includes a plurality of pixel electrode images corresponding to a plurality of pixel electrodes in the display panel respectively.

In an embodiment of the present disclosure, the predetermined light source includes a white light source, a red light source, a green light source or a blue light source.

Specifically, the step of capturing the corresponding grayscale image when the display panel is irradiated by the predetermined light source refers to the step of capturing the corresponding grayscale image in a predetermined area when the display panel is irradiated by the predetermined light source.

S202: Obtain a grayscale range of the pixel electrode image.

In an embodiment of the present disclosure, the step of obtaining the grayscale range of the pixel electrode image refers to the step of obtaining the grayscale range of the pixel electrode image corresponding to the pixel electrode. Wherein, the grayscale range covers seven ranges, respectively: white, grayish white, light gray, gray, dark gray, light black, and black, and these seven grayscale ranges can be distinguished by human eyes.

S203: Call a predetermined correspondence between a predetermined grayscale range and a pixel electrode type.

In an embodiment of the present disclosure, the pixel electrode type includes a red pixel electrode, a green pixel electrode, and a blue pixel electrode. The predetermined grayscale range is related to the light source parameters and the pixel electrode type, and different light sources irradiating different pixel electrodes will have different grayscale ranges respectively; and the same light source with different irradiation parameters irradiating on the same pixel electrode will have different grayscale ranges respectively, wherein the irradiation parameters include an irradiation distance or an irradiation angle, etc.

Therefore, the predetermined grayscale range refers to a grayscale range obtained in the conditions of a different type of pixel electrodes, the same light source, and the same irradiation parameters. The grayscale range and the pixel electrode have a one-to-one correspondence, and such one-to-one correspondence is the predetermined correspondence.

S204: Identify the pixel electrode type of the pixel electrode image according to the predetermined correspondence and grayscale range.

In an embodiment of the present disclosure, the grayscale range and the pixel electrode have a one-to-one correspondence between the grayscale range of the pixel electrode image and the predetermined correspondence, sand such correspondence can be used to identify the pixel electrode type of the pixel electrode image. Specifically, the pixel electrode type is a red pixel electrode, a green pixel electrode, or a blue pixel electrode.

S205: Determine whether or not the pixel electrode images corresponding to the pixel electrodes of the same type have a grayscale difference.

In an embodiment of the present disclosure, the pixel electrode of the same type includes a red pixel electrode, a green pixel electrode, or a blue pixel electrode.

Specifically, the grayscale values of all pixel electrodes of the same type are calculated, and such grayscale value may be used to determine whether or not the pixel electrodes of the same type have a pixel electrode image with a greater or smaller grayscale value.

S206: Determine whether or not the grayscale difference is greater than a predetermined threshold, if a grayscale difference exists in the pixel electrode images corresponding to the pixel electrodes of the same type.

In an embodiment of the present disclosure, if a grayscale difference exists in the pixel electrode images corresponding to the pixel electrodes of the same type, the grayscale value of all pixel electrode images corresponding to the pixel electrodes 100 (such as the red pixel electrodes) is obviously greater than or smaller than other pixel electrodes (such as the green and blue pixel electrodes).

Further, the grayscale difference is the difference between the grayscale value of the pixel electrode image corresponding to the pixel electrode 100 and the grayscale value of the pixel electrode image corresponding to other pixel electrodes or the absolute value of the difference.

The predetermined threshold is a grayscale value range used for determining whether or not there is an abnormal pixel electrode according to the grayscale difference, and a specific value of the predetermined threshold is set according to the requirements of the actual application.

S207: If the grayscale difference is greater than the predetermined threshold, it will be decided that the pixel electrode corresponding to the pixel electrode image having a grayscale difference is an abnormal pixel electrode.

In an embodiment of the present disclosure, if the grayscale difference is greater than the predetermined threshold, it will be decided that the pixel electrode corresponding to the pixel electrode image having a grayscale difference is an abnormal pixel electrode. The abnormal pixel electrode is the defective electrode.

In the display panel inspection method of the aforementioned embodiment, the method not just can identify different types of pixel electrodes by the grayscale only, but also can inspect a defective pixel electrode. In addition, the method may be achieved by software without increasing the hardware cost.

Figure 3:
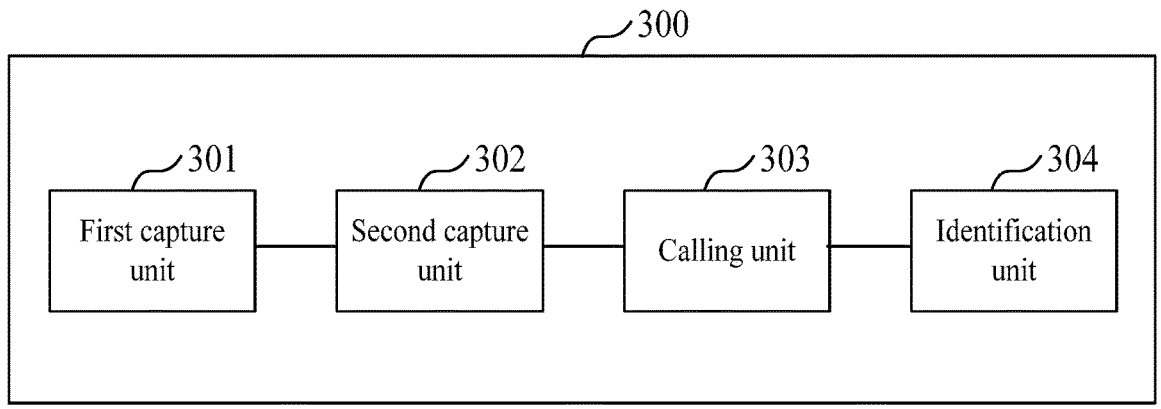
FIG. 3 is a schematic block diagram of a display panel inspection apparatus in accordance with an embodiment of the present disclosure.

With reference to FIG. 3 for a schematic block diagram of a display panel inspection apparatus in accordance with an embodiment of the present disclosure, the inspection apparatus 300 comprises a first capture unit 301, a second capture unit 302, a calling unit 303, and an identification unit 304.

The first capture unit 301 is provided for capturing a corresponding grayscale image when the display panel is irradiated by a predetermined light source, wherein the grayscale image includes a plurality of pixel electrode images corresponding to the plurality of pixel electrodes in the display panel respectively.

Wherein, the first capture unit 301 is a camera device such as a CCD camera, and the camera device is provided for capturing a panel screen image of a display panel while being irradiated by a determined light source.

Wherein, the predetermined light source includes a white light source, a red light source, a green light source, or a blue light source. There are two ways of irradiating the light source onto the display panel, respectively: a front irradiation and a back irradiation, wherein the front irradiation is corresponsive to the reflected light and the back irradiation is corresponsive to the transmitted light.

Specifically, a panel screen image is captured in the display panel while irradiating the predetermined light source first, and then the panel screen image is converted into the grayscale image.

The second capture unit 302 is provided for obtaining a grayscale range of the pixel electrode image.

Specifically, in the step of analyzing the grayscale image, a plurality of pixel electrode images is captured from the grayscale image, and a grayscale range of the pixel electrode image. Wherein, the grayscale range covers seven ranges, respectively: white, grayish white, light gray, gray, dark gray, light black, and black, and these seven grayscale ranges can be distinguished by human eyes.

The calling unit 303 is provided for calling a predetermined correspondence between the predetermined grayscale range and the pixel electrode type.

Wherein, the pixel electrode type includes a red pixel electrode, a green pixel electrode, and a blue pixel electrode. The predetermined grayscale range refers to the predetermined grayscale range refers to a grayscale range obtained in the conditions of a different type of pixel electrodes, the same light source, and the same irradiation parameters. The grayscale range and the pixel electrode have a one-to-one correspondence, and such one-to-one correspondence is the predetermined correspondence.

In an embodiment, the pixel electrode type includes a red pixel electrode, a green pixel electrode, a blue pixel electrode, and a white pixel electrode.

The identification unit 304 is provided for identifying the pixel electrode type of the pixel electrode image according to the predetermined correspondence and grayscale range.

Specifically, the pixel electrode type of the pixel electrode image can be identified according to the grayscale range of the pixel electrode image and the predetermined correspondence, and the pixel electrode type includes a red pixel electrode, a green pixel electrode, or a blue pixel electrode.

Figure 4:
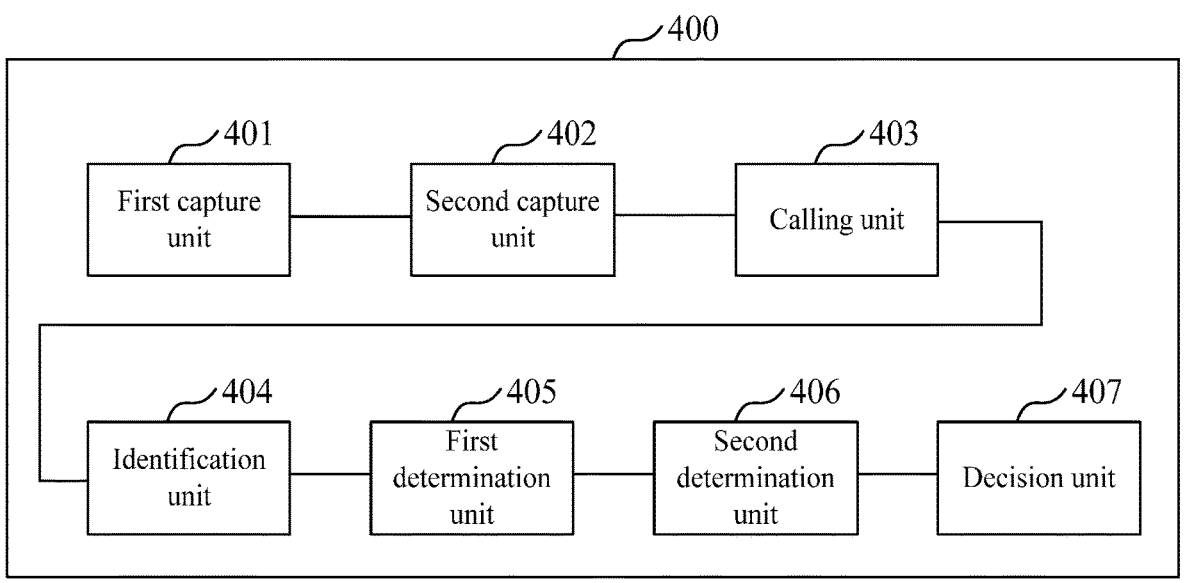
FIG. 4 is another schematic block diagram of a display panel inspection apparatus in accordance with an embodiment of the present disclosure.

With reference to FIG. 4 for a schematic block diagram of a display panel inspection apparatus in accordance with an embodiment of the present disclosure, the inspection apparatus 400 comprises: a first capture unit 401, a second capture unit 402, a calling unit 403, an identification unit 404, a first determination unit 405, a second determination unit 406, and a decision unit 407.

The first capture unit 401 is provided for capturing a corresponding grayscale image when the display panel is irradiated by a predetermined light source, wherein the grayscale image includes a plurality of pixel electrode images corresponding to the plurality of pixel electrodes in the display panel.

Specifically, the first capture unit 401 may be a camera device such as a CCD camera, and the camera device is provided for capturing a panel screen image of a display panel while being irradiated by a determined light source.

Wherein, the predetermined light source includes a white light source, a red light source, a green light source, or a blue light source. There are two ways of irradiating the light source onto the display panel, respectively: a front irradiation and a back irradiation, wherein the front irradiation is corresponsive to the reflected light and the back irradiation is corresponsive to the transmitted light.

Specifically, a panel screen image is captured in the display panel while irradiating the predetermined light source first, and then the panel screen image is converted into the grayscale image.

The second capture unit 402 is provided for obtaining the corresponding grayscale range of the pixel electrode image.

Specifically, the grayscale image is analyzed, and a plurality of pixel electrode images is captured from the grayscale image, and then a grayscale range of the pixel electrode image is obtained. Wherein, the grayscale range covers seven ranges, respectively: white, grayish white, light gray, gray, dark gray, light black, and black, and these seven grayscale ranges can be distinguished by human eyes.

The calling unit 403 is provided for calling a predetermined correspondence between the predetermined grayscale range and the pixel electrode type.

Wherein, the pixel electrode type includes a red pixel electrode, a green pixel electrode, and a blue pixel electrode. The predetermined grayscale range refers to a grayscale range obtained in the conditions of a different type of pixel electrodes, the same light source, and the same irradiation parameters. The grayscale range and the pixel electrode have a one-to-one correspondence, and such one-to-one correspondence is the predetermined correspondence.

In an embodiment, the pixel electrode type includes a red pixel electrode, a green pixel electrode, a blue pixel electrode, and a white pixel electrode.

The identification unit 404 is provided for identifying the pixel electrode type of the pixel electrode image according to the predetermined correspondence and grayscale range.

Specifically, the pixel electrode type of the pixel electrode image can be identified according to the grayscale range of the pixel electrode image and the predetermined correspondence, and the pixel electrode type includes a red pixel electrode, a green pixel electrode, or a blue pixel electrode.

The first determination unit 405 is provided for determining whether or not the pixel electrode images corresponding to the pixel electrodes of the same type have a grayscale difference.

Wherein, the pixel electrodes of the same type include a red pixel electrode, a green pixel electrode, or a blue pixel electrode.

Specifically, the grayscale values of all pixel electrodes of the same type are calculated, and these grayscale values may be used to determine whether or not there is a pixel electrode image corresponding to the pixel electrodes of the same type having a grayscale greater than or smaller than such grayscale values.

The second determination unit 406 is provided for determining whether or not the grayscale difference is greater than a predetermined threshold, if the pixel electrode images corresponding to the pixel electrodes of the same type have a grayscale difference. For example, all pixel electrode images corresponding to the pixel electrode 100 such as the red pixel electrodes have a grayscale value significantly greater than or smaller than those of other pixel electrodes. Further, the grayscale difference is the difference between the grayscale value of the pixel electrode image corresponding to the pixel electrode 100 and the grayscale value of the pixel electrode image corresponding to other pixel electrodes or the absolute value of the difference. Wherein, The predetermined threshold is a grayscale value range used for determining whether or not there is an abnormal pixel electrode according to the grayscale difference, and a specific value of the predetermined threshold is set according to the requirements of the actual application.

The decision unit 407 is provided for deciding that the pixel electrode corresponding to the pixel electrode image has a grayscale difference is an abnormal pixel electrode, if the grayscale difference is greater than the predetermined threshold.

Specifically, if the grayscale difference is greater than the predetermined threshold, then it will be decided that the pixel electrode corresponding to the pixel electrode image having the grayscale difference is an abnormal pixel electrode. The abnormal pixel electrode is the defective electrode.

People having ordinary skill in the art should be able to understand that the units and algorithms described in the embodiments can be achieved by electronic hardware, computer software, or a combination of the two. To clearly illustrate and describe the interchangeability of the hardware and software, the assemblies and procedures are described according to their functions, and these functions may be carried out by hardware or software depending on specific applications and limitations of their design. Professionals may use a different method for a specific method to achieve these functions, and such implementation should be considered to be not exceeding the scope of the present disclosure.

For simplicity and clarification, people having ordinary skill in the art should be able to refer to the corresponding operation procedures of the method as described above for the operating procedures of the aforementioned devices and units, and thus they will not be repeated.

The present disclosure is illustrated by several embodiments, but the disclosed device and method may be implemented by other methods. The embodiments of the aforementioned device are provided for the illustrative purpose. The division of units is simply a division by logical functions, and the units used in actual implementations may be divided by other ways. For example, several units or components may be combined with each other or integrated into another system, or some technical characteristics are ignored or not exercised.

In the method in accordance with of the embodiments of the present disclosure, the order of the steps may be adjusted, and the steps may be combined or skipped according to actual requirements.

In the apparatus in accordance with the embodiments of the present disclosure, the units may be combined, divided, or omitted.

While the disclosure has been described by means of specific embodiments, numerous modifications and variations could be made thereto by those skilled in the art without departing from the scope and spirit of the disclosure set forth in the claims.

What is claimed is:

1. A display panel inspection method, comprising the steps of:
capturing a grayscale image when a display panel is irradiated by a predetermined light source, wherein the grayscale image includes a plurality of pixel electrode image corresponding to a plurality of pixel electrodes in the display panel respectively;
obtaining a grayscale range of the pixel electrode image;
calling a predetermined correspondence between a predetermined grayscale range and a pixel electrode type;
identifying the pixel electrode type of the respective pixel electrode image according to the predetermined correspondence and the grayscale range;
determining whether or not the pixel electrode images corresponding to the pixel electrodes of the same type have a grayscale difference;
determining whether or not the grayscale difference is greater than a predetermined threshold if the pixel electrode images corresponding to the pixel electrodes of the same type have a grayscale difference;
deciding that the pixel electrode corresponding to the pixel electrode image having the grayscale difference is an abnormal pixel electrode, if the grayscale difference is greater than the predetermined threshold.

2. The display panel inspection method of claim 1, wherein the step of capturing the grayscale image when the display panel is irradiated by the predetermined light source further comprises the steps of: capturing a corresponding panel screen image when the display panel is irradiated by the predetermined light source; and converting the panel screen image into the grayscale image.

3. The display panel inspection method of claim 1, wherein the step of capturing the grayscale image when the display panel is irradiated by the predetermined light source further comprises the step of: capturing a grayscale image reflected onto a predetermined area when the display panel is irradiated by the predetermined light source.

4. The display panel inspection method of claim 3, wherein the predetermined light source includes a white light source, a red light source, a green light source, or a blue light source.

5. The display panel inspection method of claim 4, wherein the step of calling the predetermined correspondence between the predetermined grayscale range and the pixel electrode type further comprises the step of calling the correspondence between the predetermined grayscale range of the white light source, red light source, green light source or blue light source and the pixel electrode type.

6. The display panel inspection method of claim 1, wherein the pixel electrode type includes a red pixel electrode, a green pixel electrode, and a blue pixel electrode.

7. The display panel inspection method of claim 1, wherein the predetermined light source is irradiated by an irradiation method selected from the group consisting of a front irradiation and a back irradiation.

8. The display panel inspection method of claim 1, wherein the grayscale range covers seven ranges, respectively: white, grayish white, light gray, gray, dark gray, light black, and black.

9. A display panel inspection method, comprising the steps of:
capturing a grayscale image when a display panel is irradiated by a predetermined light source, wherein the grayscale image includes a plurality of pixel electrode images corresponding to a plurality of pixel electrodes in the display panel respectively;
obtaining a grayscale range of the corresponding pixel electrode image;
calling a predetermined correspondence between a predetermined grayscale range and a pixel electrode type; and
identifying the pixel electrode type corresponding to the pixel electrode image according to the predetermined correspondence and grayscale range.

10. The display panel inspection method of claim 9, wherein the step of capturing the grayscale image when the display panel is irradiated by the predetermined light source further comprises the steps of: capturing a panel screen image when the display panel is irradiated by the predetermined light source; and converting the panel screen image into the grayscale image.

11. The display panel inspection method of claim 9, wherein the step of capturing the grayscale image when the display panel is irradiated by the predetermined light source further comprises the step of capturing a grayscale image reflected onto a predetermined area when the display panel is irradiated by the predetermined light source.

12. The display panel inspection method of claim 11, wherein the predetermined light source includes a white light source, a red light source, a green light source or a blue light source; and the step of calling the predetermined correspondence between the predetermined grayscale range and the pixel electrode type further comprises the step of calling the correspondence between the predetermined grayscale range of the white light source, red light source, green light source or blue light source and the pixel electrode type.

13. The display panel inspection method of claim 11, wherein the pixel electrode type includes a red pixel electrode, a green pixel electrode, and a blue pixel electrode.

14. The display panel inspection method of claim 10, wherein the predetermined light source is irradiated by an irradiation method selected from the group consisting of a front irradiation and a back irradiation.

15. The display panel inspection method of claim 10, wherein the grayscale range covers seven ranges, respectively white, grayish white, light gray, gray, dark gray, light black, and black.

16. A display panel inspection apparatus, comprising:
a first capture unit, for capturing a grayscale image when the display panel is irradiated by a predetermined light source, wherein the grayscale image includes a plurality of pixel electrode images corresponding to the plurality of pixel electrodes in the display panel respectively;
a second capture unit, for obtaining a grayscale range of the corresponding pixel electrode image;
a calling unit, for calling a predetermined correspondence between a predetermined grayscale range and a pixel electrode type; and
an identification unit, for identifying the pixel electrode type of the pixel electrode image according to the predetermined correspondence and grayscale range.

17. The display panel inspection apparatus of claim 16, further comprising: a first determination unit, for determining whether or not the pixel electrode images corresponding to the pixel electrodes of the same type have a grayscale difference; a second determination unit, for determining whether or not the grayscale difference is greater than a predetermined threshold, if the pixel electrode images corresponding to the pixel electrodes of the same type have a grayscale difference; and a decision unit, for deciding that the pixel electrode corresponding to the pixel electrode image has a grayscale difference is an abnormal pixel electrode, if the grayscale difference is greater than the predetermined threshold.

18. The display panel inspection apparatus of claim 17, wherein the first capture unit is specifically provided for capturing a grayscale image reflected to a predetermined area when the display panel is irradiated by the predetermined light source.

19. The display panel inspection apparatus of claim 18, wherein the predetermined light source includes a white light source, a red light source, a green light source, or a blue light source; and the calling unit is specifically provided for calling a correspondence between the predetermined grayscale range of the white light source, red light source, green light source or blue light source and the pixel electrode type.

20. The display panel inspection apparatus of claim 18, wherein the pixel electrode type includes a red pixel electrode, a green pixel electrode and a blue pixel electrode.

* * * * *